Patented Nov. 26, 1940

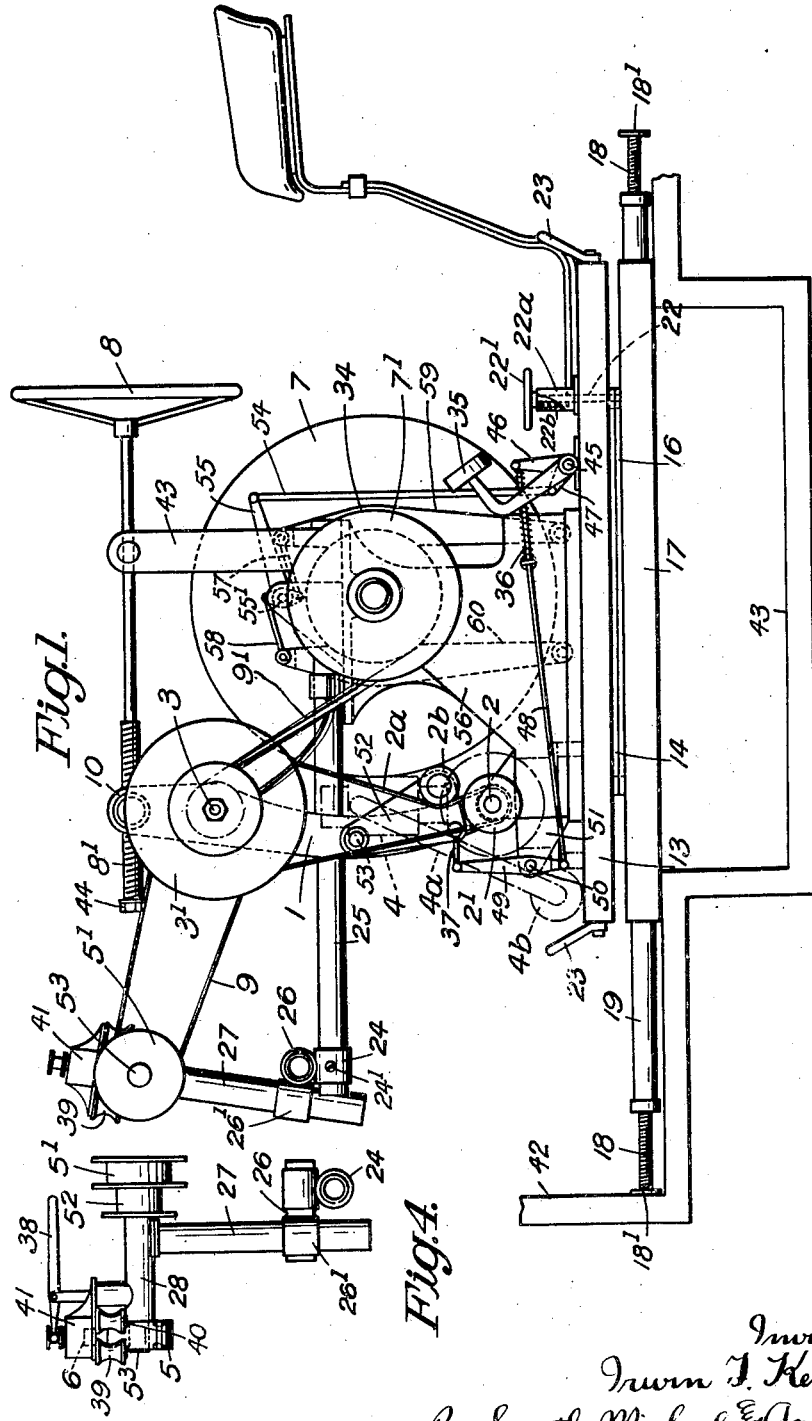

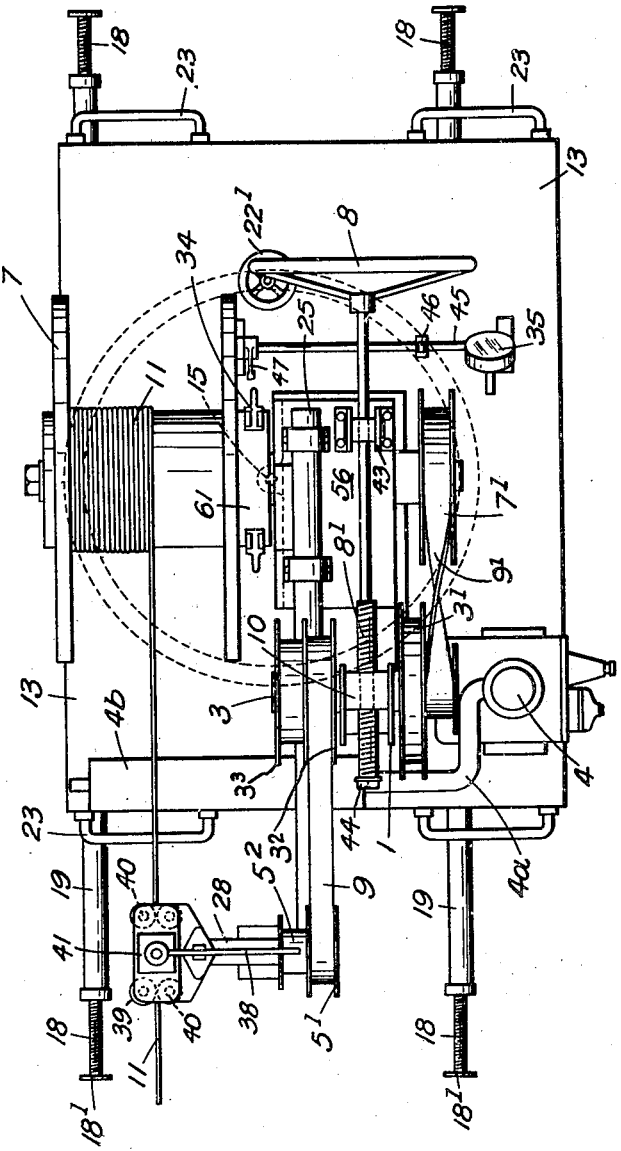

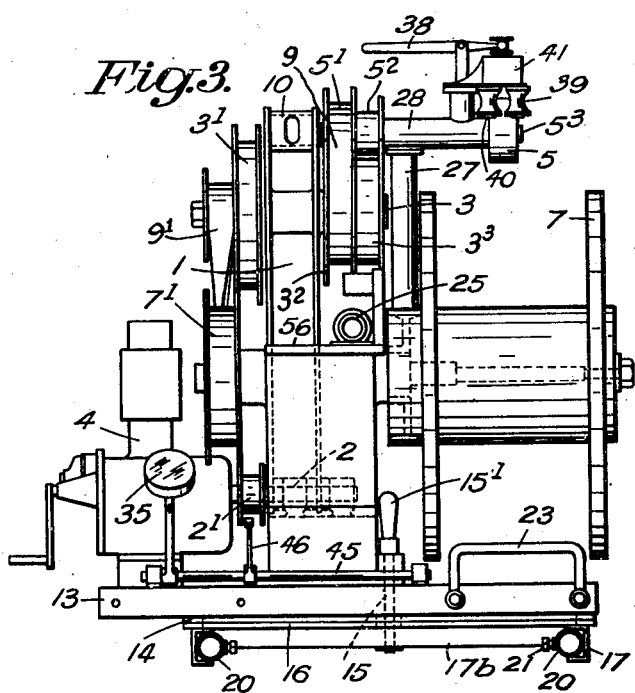

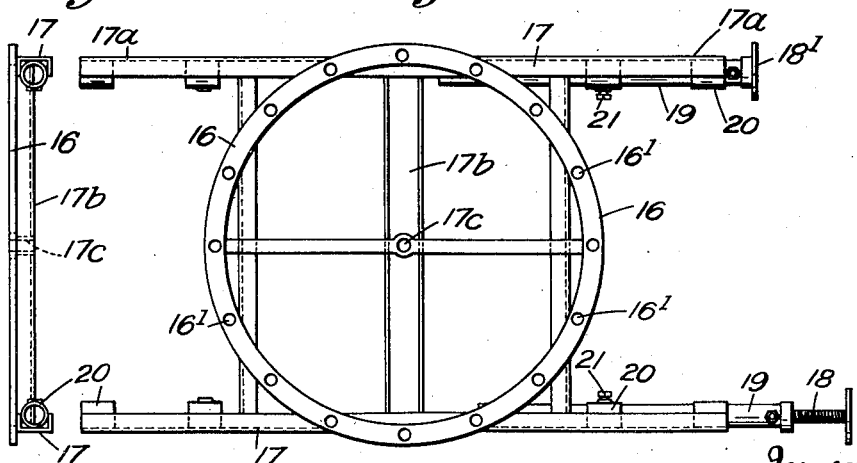

2,223,110

UNITED STATES PATENT OFFICE 2,223,110

CABLE LAYER AND RECOVERY APPARATUS

Irwin Trevanion Kempe, Longparish, Andover, England

Application October 28, 1937, Serial No. 171,559
In Great Britain November 5, 1936

6 Claims. (Cl. 242—54)

This invention relates to apparatus for temporarily laying and thereafter picking up electric cables such as telephone wires or cables, and it is especially applicable to use in military exercises or operations where telephone cables have to be laid on the ground or supported on hedges or the like.

The improved apparatus is of the kind employing feed rolls and a cable drum mounted on a support such as a vehicle or a platform. Apparatus of this kind is described in my pending application Serial No. 123,939, now Patent 2,203,435, dated July 4, 1940.

The present invention has for objects to mount the cable layer on a turntable whereby cable may be fed out from the apparatus in any direction; to allow the cable to be paid out from one side of the apparatus and to be reeled in, if desired, from another side of the apparatus; to provide improved means for adjusting the height and direction of delivery of the cable; and to anchor the apparatus securely in a body-fitted vehicle. Other features of the present invention will be hereafter indicated.

In carrying out the present invention, the feed rolls and cable drum spindle are mounted on a platform fitted with a turntable device so that the apparatus can be oriented through 360° in plan, means being provided for locking the platform in the desired angular position. The feed rolls may be mounted on a support which can be slid along a horizontal or approximately horizontal member carried by the platform, said support also allowing adjustment of the feed rolls in a vertical direction.

The invention is hereafter described with reference to the annexed drawings, in which—

Fig. 1 is a side elevation and Fig. 2 is a plan of the apparatus showing the turntable device. Fig. 1 also shows part of a vehicle body.

Fig. 3 is a rear elevation of Fig. 1, with some parts removed.

Fig. 4 is a detached view of part of Fig. 1, and at right angles thereto.

Figs. 5 and 6 are plan views of the upper and lower platforms respectively.

Fig. 5a is an end view of Fig. 5, and

Fig. 6a is an end view of Fig. 6.

Fig. 7 is a diagram showing a modified form of attachment for the cable drum to its spindle.

Figs. 8 and 9 are elevations at right angles to one another, showing a removable outside bearing for the spindle of the cable drum.

The improved apparatus is mounted upon a transportable base or carrier, which may be operated from any suitable transport vehicle. A beam 1 is mounted at its lower end upon a driving shaft 2 so that it can be tilted to either side of the vertical. This driving shaft 2 carried by a table 56 upstanding from an upper platform 13 and is rotated by any suitable means such as by a motor, a flexible power-shaft or a crank-handle. At its upper part, the beam is provided with a countershaft 3 in such a way that in any position between its extreme positions, the countershaft is driven by the source of power e. g. the internal combustion engine 4, or by manual rotation of the driving shaft. By suitable transmission devices, the countershaft 3 drives one of the feed-rolls 5—6 or alternatively the cable-drum 7; these transmission devices may comprise for example, belt pulleys $2^1$, $3^1$, $3^2$, $3^3$, $5^1$, $7^1$ on the driving shaft 2, countershaft 3, lower feed-roll shaft $5^3$ and cable-drum shaft respectively, and two alternatively operative belts 9—$9^1$ for driving either the feed-rolls 5—6 or the cable-drum 7, the belt 9 being open and the belt $9^1$ being crossed. The rolls 5—6 may be rubber-faced, if desired. The upper roll 6 is spring-pressed against the mechanically rotated roll 5. At 38 I have shown a pivoted lever for removing the spring pressure from roll 6 in the known manner.

In Fig. 1, the belt 9 is shown driving the feed-rolls, but the crossed belt $9^1$ for rotating the cable-drum is shown in slack condition; when driving the cable-drum, the belt $9^1$ is drawn tight but the belt 9 is slackened. The two belts can be tightened and slackened respectively by appropriate tilting movement of the beam 1.

The driving shaft 2 is shown rotated by the engine 4 which with the supports for the feed-rolls and the cable-drum is mounted on an upper platform 13, the driving shaft 2 being on the same axis as the flywheel of the engine 4 with a suitable clutch interposed. Thus in the usual manner, the drive from engine 4 can be interrupted when desired. The engine 4 has an exhaust pipe 4a and silencer 4b. A belt 2a from the pulley $2^1$ drives the pulley $3^1$ with an interposed jockey pulley 2b on the beam 1. The arrangement is very similar to that described in my pending application No. 123,939.

The tilting beam 1 is controlled as to position by a suitably supported hand-wheel 8 and screwed spindle $8^1$, the latter engaging a nut 10 socketed or trunnioned in the upper part of the beam 1 above the countershaft 3; the location of the nut 10 at top of the beam enables a finer adjustment of the beam to be obtained. The beam 1 is tilted and the belts 9—9¹ thereby slackened or tightened by rotating the spindle 8¹ by means of wheel 8 and causing the nut 10 to travel along the screw. The plain portion of screw threaded spindle 8¹ passes through pillar 43 upstanding from platform 13. The end of spindle 8¹ is fitted with a washer and nut 44.

The cable 11 can thus be positively drawn out or fed out through the feed-rolls 5—6 from the cable-drum 7. Guide-rolls 39, 39 are shown mounted on spindles 40, 40 set at right angles to the axis of shaft 5³, and secured to the casing 41 of the feed-roll device.

By slacking the belt 9 (from the countershaft 3) which drives the feed-rolls 5—6, the speed of rotation of the feed-rolls relatively to that of the countershaft 3 can be slightly reduced.

If desired, a variable transmission ratio may be provided in the drive to the feed-rolls, for the same purpose. Fig. 4 shows belt pulleys 5¹, 5² of different diameter on the lower feed-roll shaft 5³ so that the feed-rolls 5—6 with the cable 11 passing therebetween can be rotated at either of two rates of speed by engaging the belt 9 upon either of the pulleys 5¹—5² on the feed-roll shaft and upon the aligned pulley 3² or 3³ on the countershaft.

The upper platform 13 is provided with a turntable device to allow the feed-rolls 5—6 to present the cable 11 in any direction and I also provide means for locking the said platform in its swivelling movement. This upper platform 13 is secured to an upper metal ring 14 so as to rotate therewith, a diametrical cross bar 14¹ being apertured or socketed at 14a to fit the center pin 15. This center pin is removable and is best seen in Fig. 3. This ring 14 rests upon a lower metal ring 16 secured to the lower platform or base 17.

The base 17 is provided with a number of horizontally-projecting adjusting screws 18 so that said base can be fixed in position by pressure of the said screws against for instance, the sides of a vehicle body. This arrangement of lower platform 17 with adjustable holding screws 18 enables the apparatus to be fitted to a lorry having either a platform body or a well-type body. Part of one of the sides 42 of a vehicle body is shown in Fig. 1, part of the well being also indicated at 43.

As shown, these screws 18 resemble screw-jacks and they comprise tubular members 19, adapted to be closed up as seen at the right hand side of Fig. 6, or to be extended as shown on the left hand side of Fig. 2. The outer tubular member 19 is held in lugs or clips 20 by set-screws 21. The screw 18 with pad 18¹ engages the interiorly screw-threaded tubular member 19 and when all are extended so that the pads 18¹ of the screws 18 bear against the opposite sides of the vehicle body, the apparatus is anchored in position.

By the provision of the set-screws 21, the screw-jacks 18—19 are removable from the lower platform 17.

The preferred construction of the upper and lower platforms 13 and 17 will be best seen in Figs. 5 and 6. The upper platform 13 is of rectangular shape made for example from sheet steel, with the sides bent down to form a channel and having cross members 13a and 13b each of shallow trough shape. The cross member 13a is provided with a socket 13c to permit the passage of the center pin 15, such aperture or socket 13c registering with the socket or aperture 14a of the cross bar 14¹ of the upper ring. The lower platform or base 17 is also of rectangular shape and made with advantage of channel section steel, two of the sides being continued in opposite directions by channel section extensions 17a which are adapted to receive the tubular members 19. This lower platform 17 is provided diametrically with a cross member 17b and is fitted with a central socket 17c to engage the aforesaid center pin 15. A handle 15¹ is provided upon the center pin to facilitate its removal when required. The rings 14 and 16 form wearing pieces for the upper and lower platforms 13 and 17, and the upper platform 13 is shown provided with hand-rails 23 to assist in its manipulation.

In order to lock the rotatable parts 13—14 in position relatively to the fixed parts 16—17, I provide a locking device consisting of a stem 22, preferably spring-loaded as indicated at 22b and fitted with a hand-wheel 22¹, this stem passing through the spring-containing boss 22a and the hole 14b in the upper ring 14, and the extremity of the stem 22 entering one of the series of holes 16¹ in the lower ring 16. In this way the exact position of the upper ring 14 and upper platform 13 in relation to the base 17 can be fixed, and it is therefore possible by turning the parts 13—14 to direct the feed rolls so that they pay out the cable 11 towards any position desired.

Instead of being secured to a lower platform such as 17 having a wearing ring 16 mounted thereon, the fixing screws 18 and their tubular holders 19 may be attached to some other form of supporting base for the turntable, as will be obvious.

The feed-rolls 5—6 for paying-out or reeling-in the cable 11 are mounted upon a support which can be slid along a horizontal (or approximately horizontal) member carried by the upper platform 13. As shown (see Figs. 1 and 4), a sleeve 24 may be slidable along a tubular member or rail 25 carried by table 56 and be clamped to said rail by set screws 24¹ or the like. This sleeve 24 carries a cross pivot or tube 26 projecting to one side of the rail 25 and holding an arm 27 extending to a cross arm device 28 for carrying the superposed rolls 5—6. The tube 26 is provided with a socket member 26¹ brazed or otherwise secured thereto; this socket member carries a set screw or is split to be clamped by a bolt around the arm 27 for fixing the arm at the desired height. The feed rolls 5—6 can thus be raised or lowered by sliding the arm 27 in the socket member 26¹, for example according to the height of the body sides of the vehicle from which the cable is being paid out, and can also be set to throw the cable at any required angle of inclination above or below the horizontal by turning the tube or cross pivot 26 in relation to the sleeve 24, according to the height at which the cable is being laid; the sleeve 24 is also slidable along the rail 25 if necessary in order to suit the available length of the belt 9 according to the position of the arm 27. The roll 5 nearer the pivot tube 26 is preferably larger than the outer roll 6 and it is adapted to be driven in the manner before described from the countershaft 3. The smaller outer roll 6 is spring-pressed in the known manner to act as a pressure roller and the cable 11 is fed between the two rolls.

The cable-drum 7 is provided with a suitable brake 34 (e. g., caliper type, co-operating with a brake-drum on the cable-drum) to control the unwinding of the cable from the cable-drum. A pedal 35 is shown adapted to operate the brake shoes 34 and to release jockey pulley 2b. The shaft 45 of pedal 35 carries crank arms 46 and 47 which move with the pedal 35. A coiled spring 36 on rod 48 bears against crank arm 46. The rod 48 is pivoted to arm 46 and to one end of a rocker-lever 49 pivoted at 50 to a bracket 51 supported from table 56. The other end of rocker 49 is connected by a pivoted link 37 to a triangular plate 52 pivoted upon beam 1 at 53 and carrying the jockey-pulley 2b. The spring 36 through rocker 49 and link 37 normally keeps the pulley 2b in the belt-tensioning position. When pedal 35 is depressed, the crank arm 46 through rod 48 and link 37 tilts the plate 52 about its pivot 53 and moves the jockey pulley 2b to the right on the drawing so that it no longer tensions the belt 2a.

The crank arm 47 is pivoted to rod 54 connected with T-shaped lever 55 pivoted at 55' to the top of table 56. This T-lever 55 by means of pivoted links 57, 58 operates the brake blocks 34 mounted on arms 59, 60 each pivotally mounted at the bottom on the table 56 adjacent to platform 13. By depressing pedal 35, the T-lever 55 is tilted to cause the brake blocks 34 to be applied against the brake drum 61. Thus the depression of pedal 35 by the operator, applies the brake to brake drum 61 and releases the jockey pulley 2b from its belt-tensioning position.

The cable-drum 7 co-operating with the tilting beam 1 and feed-rolls 5—6 is shown in Fig. 7 mounted on a horizontal spindle 29 journaled in table 56 and provided with a flanged disc $29^1$ secured on said spindle (e. g. by welding) in such a way that one cheek or plate of the drum will contact with the flange of disc $29^1$; a loose flanged disc 30 is afterwards secured upon the outer end of the spindle 29. This outer end is screw-threaded and fitted with a nut and washer. The flanges on the discs $29^1$ and 30 bear against the cheeks or end plates preferably in such a way as to register with the core or cylindrical center-portion of the cable-drum. This arrangement avoids an outside bearing for the spindle of the cable-drum and is a simple construction, easy to assemble or dismount, the flanges of the discs bearing against the cheeks of the drum well away from the hub or central portion of the drum.

In the arrangement of Figs. 8 and 9, an outside, removable bearing supports the outer end of the spindle 29. As illustrated, it includes a ball or roller hub 31 to engage the end of the spindle 29, such hub being mounted on a bracket 32 of, for example, inverted V-shape adapted to be secured to the upper platform 13. If desired, this bracket 32 may at its lower end be fitted with spring-loaded plungers or centering devices 33 where it is secured to the platform 13, in order to position the outside bearing.

The countershaft has been described as driven from an internal combustion engine 4 carried by the upper platform 13. If desired, however, the driving shaft 2 or the countershaft 3 can be rotated by a flexible shaft driven from some other source of power. The driving shaft or countershaft may be arranged to be rotated by hand, if required, in case the power unit should fail.

By means of the present apparatus, the cable can be rapidly paid out or rapidly reeled in without being twisted and without unduly tensioning the cable and the apparatus can be oriented to pay out the cable in any desired direction, to either side or to the rear of a travelling vehicle. The cable can also be laid in a slack line because the speed of paying out by and between the feed-rolls is independent of the speed of the vehicle on which the apparatus is mounted, so that undue tension is not applied to the cable on the ground, and further the line is sufficiently slack to enable it to be afterwards raised from the ground and supported above a "cross-over" such as a road, whenever necessary.

Furthermore, by reason of the provision of the turntable device, the apparatus can lay the cable from either side of a vehicle and subsequently pick up the laid cable, by turning the apparatus so that the feed rolls are on the other side of the vehicle, the latter travelling forwardly on both the outward and homeward direction. The cable can however, be paid out in the wake of a travelling vehicle and picked up by turning the apparatus through 180° so that the feed-rolls (now acting as guides) direct the cable to the storage drum. The provision of means for adjustment of the feed-rolls for height and in all directions is of the utmost importance in connection with the laying of cable over or along irregular ground or varying supports such as hedges, walls, bushes and the like.

The apparatus can be applied to the temporary laying of cables other than for military signalling.

What I claim is:

1. A transportable cable layer and recovery apparatus, comprising an upper platform, means carried by said platform for storing cable, means carried by said platform for positively paying out said cable from said platform, a power-actuated device carried by said platform for operating either of said means, a lower platform located below said upper platform and supporting said upper platform, a turntable device located between said platforms to allow rotation of said upper platform on the lower platform, and means carried by one of said platforms for immobilizing said upper platform in relation to said lower platform.

2. In a cable-laying and recovery apparatus comprising a rotatable cable drum and a feed-roll device with means for rotating either the cable drum or the feed-roll device, the combination of a platform carrying said cable drum, said feed-roll device and said rotating means, a base member supporting said platform, a turntable device located between said platform and said base member to allow the platform to rotate upon the base member, means carried by the platform for holding the platform against rotation, and oppositely directed screw-jacks carried by said base member and extensible in the plane of said base member.

3. In a cable laying and recovery apparatus comprising a rotatable cable drum, a feed-roll device and means for selectively driving either said drum or said feed-roll device, the combination of a carrier platform having said drum, said feed-roll device and said selective driving means mounted thereon, a base member supporting said carrier platform and including at two of its sides channel-section extensions projecting in opposite directions in the plane of said base member, a turntable device located between said carrier platform and said base member to permit rotation of said platform around said base member, tubular holders secured in said channel section extensions, said holders being screw-threaded internally, and screw-threaded adjusting screws engaged by said tubular holders and provided extremitally with bearing pads.

4. A cable laying and recovery device, comprising a carrier platform, a rotatable cable drum mounted on said platform, a feed-roll device for paying out the cable from said drum, and means carried by the platform for rotating either the cable drum or the feed-roll device, said cable drum including cheek plates separated by a central core, a spindle for the cable drum provided at the inner end with a flanged disc, and a removable flanged disc adapted to be secured upon the outer end of said spindle, the flanges of said discs bearing against the cheek plates of the drum and registering with said core of said drum.

5. In a cable laying and recovery device comprising a rotatable cable drum, a feed-roll device for positively paying out the cable from said drum, and means for rotating either the cable drum or the feed-roll device, the combination of a platform carrying said cable drum and said rotating means, a support carried by the platform and having said feed-roll device mounted thereon, said support including a rail substantially parallel with the platform, a sleeve slidable on said rail, and an arm connected to said feed-roll device, said arm being adjustable up and down in relation to said sleeve for varying the height of said feed-roll device above said platform.

6. A cable laying and recovery device comprising a carrier platform rotatable about a vertical axis, a cable storage drum, a feed-roll device, a support for said cable drum and feed-roll device mounted on said carrier platform, a beam pivoted at its lower end upon said support, a traveller nut trunnioned on the upper end of said beam, a screw-threaded control spindle engaged by said travelling nut, a countershaft mounted in said beam, transmission devices driven by said countershaft in different positions of said pivoted beam, said transmission devices being connected to said cable drum and to said feed-roll device respectively, and means by which said control spindle may be rotated to move said beam to different positions.

IRWIN TREVANION KEMPE.